No. 825,089. PATENTED JULY 3, 1906.
D. THOMAS.
BELT FOR BRAKE WHEELS.
APPLICATION FILED SEPT. 9, 1905.
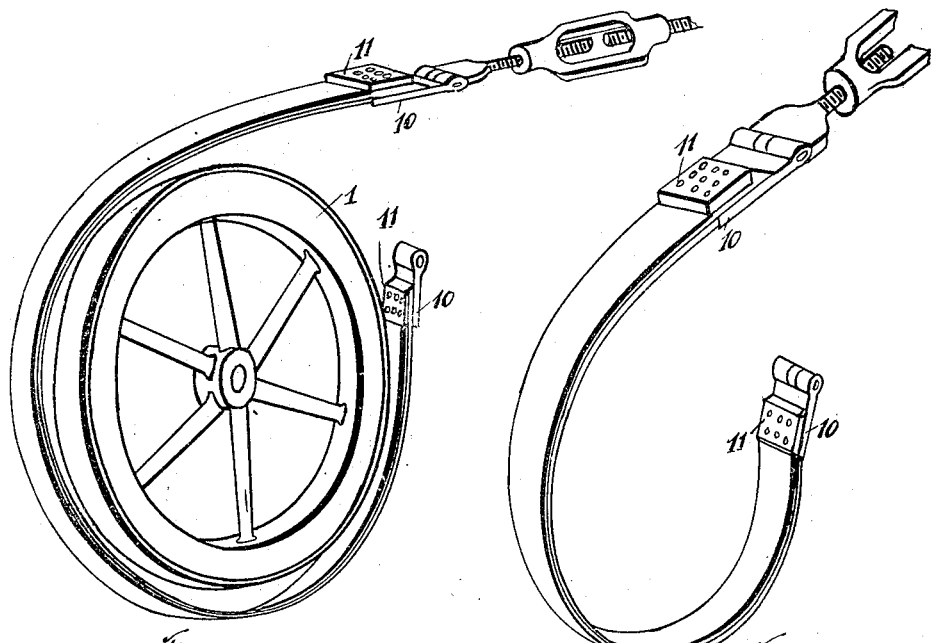
Fig. 1. Fig. 2.
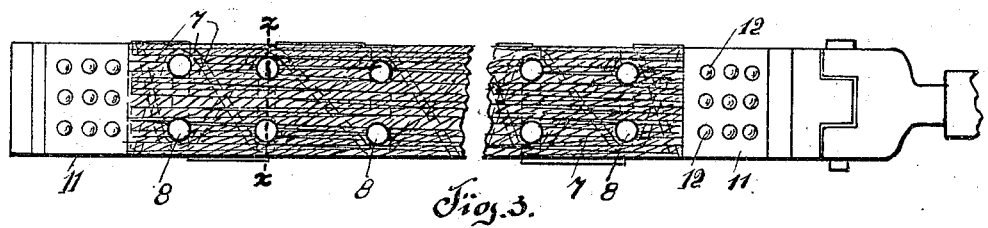
Fig. 3.
 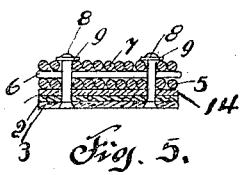
Fig. 4. Fig. 5.
Witnesses:
C. Klostermann
R. H. Butler
Inventor,
Daniel Thomas.
by A. C. Ewert & Co.
Attorneys.

UNITED STATES PATENT OFFICE.

DANIEL THOMAS, OF GIRARD, OHIO.

BELT FOR BRAKE-WHEELS.

No. 825,089.　　　　Specification of Letters Patent.　　　　Patented July 3, 1906.

Application filed September 9, 1905. Serial No. 277,747.

*To all whom it may concern:*

Be it known that I, DANIEL THOMAS, a citizen of the United States of America, residing at Girard, in the county of Trumbull and State of Ohio, have invented certain new and useful Improvements in Belts for Brake-Wheels, of which the following is a specification, reference being had therein to the accompanying drawings.

This invention relates to certain new and useful improvements in belts for brake-wheels; and the invention has for its object to provide a novel form of belt free from all danger of being broken or injured by a sudden application of the belt to a brake-wheel.

My invention aims to provide a novel form of belt which will withstand a considerable amount of wear before the same is rendered useless, and in this connection I have constructed a belt consisting of a number of elements, each of which is strong and durable and when combined to form a belt the longevity of which is materially increased.

Heretofore considerable trouble and expense has been incurred by brake belts or bands cracking and eventually breaking at the points where they are fastened to the actuating mechanism for operating the belt to brake a wheel. It has been found in practice that before the belts wear from frictional contact with brake-wheels they crack and break at the points where the ends of the belt or band are gripped, this wearing and breaking of the belt or band reducing the usefulness of the same, consequently increasing the expense of this form of brake mechanism.

My invention obviates the necessity of continually renewing brake-bands, this being accomplished by providing a band or belt having certain properties or elements which eliminate the possibility of the belt or band being broken or cracked by constant use.

With the above and other objects in view, which will more readily appear as the nature of the invention is better understood, the same consists in the novel construction, combination, and arrangement of parts, to be hereinafter more fully described and claimed.

In order that my invention may be fully understood, reference will herein be had to the accompanying drawings, illustrating the preferred embodiments of my invention, and throughout the several views of which like numerals of reference designate corresponding parts.

Figure 1 is a perspective view of a brake-wheel and my improved brake band or belt. Fig. 2 is a similar view of the brake band or belt detached from the wheel. Fig. 3 is a plan, partially broken away, of the brake band or belt. Fig. 4 is a sectional view taken on the line $x\ x$ of Fig. 3. Fig. 5 is a similar view of a modified form of construction.

To put my invention into practice, I construct my improved brake belt or band of leather or rawhide, fiber or wood, or strands of wire and employ metallic plates, bolts, and rivets to hold these elements together. It will of course be understood that my improved brake belts or bands can be made of any desired length, and we will assume that the belt or band is to partially surround a brake-wheel 1, as illustrated in Fig. 1 of the drawings. Two pieces of leather or rawhide 2 and 3 are employed, and upon these pieces of leather or rawhide I place a layer of fiber 4. Arranged upon the fiber are cables 5, which are interlaced, and each cable consists of a plurality of interlaced wires. These cables are arranged the entire length of the belt or band, and upon the top of these cables I arrange in a sinuous form strands of wire 6, these wires being arranged transversely of the belt at predetermined points, as indicated in dotted lines in Fig. 3 of the drawings. Upon the top of the strands of wire 6 are longitudinally-arranged cables 7, similar to the cables 5.

To retain the different elements of the belt together, I employ rivets 8 8, these rivets extending through the leather or rawhide or fiber and upwardly between the cables and the strands of wire 6, the ends of the rivets 8 8 being provided with washers 9 9 to facilitate them in engaging the outer layer of cables 7. The combination of these different elements forms a flexible belt or band having sufficient rigidity to form a strong and durable band, and by reinforcing or strengthening the leather or rawhide of the belt or band with cables and strands of wire, should the leather or rawhide crack and eventually become broken the cables, together with the rivets, will retain the different parts of the leather or rawhide in position until it has become thoroughly worn and needs renewing. In employing the fiber as an intermediate element the heat which may arise from the frictional contact of the leather or rawhide with the periphery of the brake-wheel is prevented from in any manner affecting the cables or wire employed for strengthening the leather or rawhide.

To secure the ends of the brake band or belt to a suitable actuating mechanism, I employ metallic plates 10 10 and 11 11, which are clamped to the bottom and top surfaces of the ends of the belt or band, and by nuts and bolts or rivets 12, a plurality of nuts and bolts being employed to insure a perfect gripping of the ends of the belt or band. The plates 10 10 are constructed whereby one end of the belt or band can be held stationary, while the opposite end may be suitably actuated to cause the belt or band to firmly engage the wheel 1, I not caring to limit myself to any specific form of actuating mechanism, as it is arbitrary and not within the scope of the invention.

By referring to Figs. 1 and 2 it will be observed that the ends of the pieces of leather or rawhide are not held between the plates 10 or 11, but are simply secured to the cables and strands of wire by the rivets 8. This construction permits of the leather or rawhide assuming a position natural to the curvature of the belt or band, and as considerable trouble has been experienced in the leather heretofore used cracking and eventually breaking at its connection with the plates 10 and 11 this cracking and breaking of the leather is entirely eliminated and the use of the belt or band lengthened.

In Fig. 5 of the drawings I have illustrated wood 14 as a substitute for the fiber, and in this connection I do not care to confine myself to fiber or wood, as other material possessing the same or substantially the same characteristics may be employed.

It is thought from the foregoing that the construction, operation, and advantages of the herein-described belt for brake-wheels will be apparent without further description.

What I claim, and desire to secure by Letters Patent, is—

1. A brake-band of the type described consisting of leather, fiber arranged upon said leather, longitudinally-arranged cables, strands of wire sinuously arranged upon said cables, cables longitudinally arranged upon said strands of wire, rivets locking said elements together, metallic plates clamping the ends of said elements together, substantially as described.

2. In a brake-band, the combination of leather, fiber, cables, strands of wire, and means for securing said elements together, substantially as described.

3. In a brake-band, the combination of leather strips, cables extending longitudinally of the leather strips, and means for securing said leather strips to said cables, substantially as described.

4. In a brake-band, the combination of rawhide strips, and cables disposed longitudinally of the rawhide strips and extending beyond the ends of the same, means to secure said rawhide to said cables, connectors attached to said cables beyond the ends of the rawhide strips, substantially as described.

In testimony whereof I affix my signature in the presence of two witnesses.

DANIEL THOMAS.

Witnesses:
S. E. GOODRICH,
C. D. GOODRICH.